United States Patent [19]

Creedon

[11] Patent Number: 4,569,539
[45] Date of Patent: Feb. 11, 1986

[54] PIPE JOINT

[75] Inventor: Richard L. Creedon, San Diego, Calif.

[73] Assignee: GA Technologies Inc., San Diego, Calif.

[21] Appl. No.: 450,978

[22] Filed: Dec. 17, 1982

[51] Int. Cl.$^4$ ............................................. F16L 35/00
[52] U.S. Cl. ..................................... 285/18; 285/187;
285/310; 285/375; 285/379; 285/DIG. 18;
285/DIG. 21; 277/236
[58] Field of Search ............... 285/187, 375, DIG. 18,
285/DIG. 21, 311, 310, 379; 277/40, 48, 49, 236

[56] References Cited

U.S. PATENT DOCUMENTS

| 1,987,372 | 1/1935 | Schellhammer | 285/135 |
|---|---|---|---|
| 2,330,841 | 10/1943 | Parker | 285/86 |
| 2,405,152 | 8/1946 | Kilchenmann | 123/173 |
| 2,561,884 | 6/1946 | Perrow | 285/163 |
| 2,604,507 | 7/1952 | Tyson | 174/35 |
| 3,033,595 | 5/1962 | Bard | 285/137 |
| 3,093,398 | 6/1963 | Fawcett et al. | 285/173 |
| 3,232,643 | 2/1966 | Mikeska | 285/187 X |
| 3,269,735 | 8/1966 | Whittaker | 277/33 |
| 3,411,812 | 11/1968 | Prince et al. | 285/187 |
| 3,458,220 | 7/1969 | Rose et al. | 277/236 X |
| 3,490,777 | 1/1970 | Emmerson | 277/236 X |
| 3,494,641 | 2/1970 | Caregnato | 285/311 |
| 3,510,140 | 5/1970 | Hermann | 277/205 |
| 3,617,075 | 11/1971 | Van Horn | 285/13 |
| 3,656,784 | 4/1972 | Dow et al. | 285/187 |
| 3,687,494 | 8/1972 | Graff | 285/341 |
| 3,759,552 | 9/1973 | Levinsohn et al. | 285/DIG. 18 |
| 3,827,731 | 8/1974 | Floessel et al. | 285/187 |
| 3,834,666 | 9/1974 | Keith | 285/187 X |
| 3,853,336 | 12/1974 | Shank | 285/187 X |
| 4,186,932 | 2/1980 | Emhardt et al. | 277/207 A |

Primary Examiner—Dave W. Arola
Attorney, Agent, or Firm—Fitch, Even, Tabin & Flannery

[57] ABSTRACT

A reclosable remote control pipe joint particularly suitable for use in fusion reactors and in other radioactive environments employs a spring to maintain sealing force between a sealing ring and a sealing face. The spring permits the pipe joint to remain intact despite mechanical disturbances of the pipes. A backup ring partially encloses the sealing ring to control thermal strain of the sealing ring. A closure system employs a plurality of pivoting arms and a movable roller assembly to clamp together the end fittings to seal the joint.

13 Claims, 5 Drawing Figures

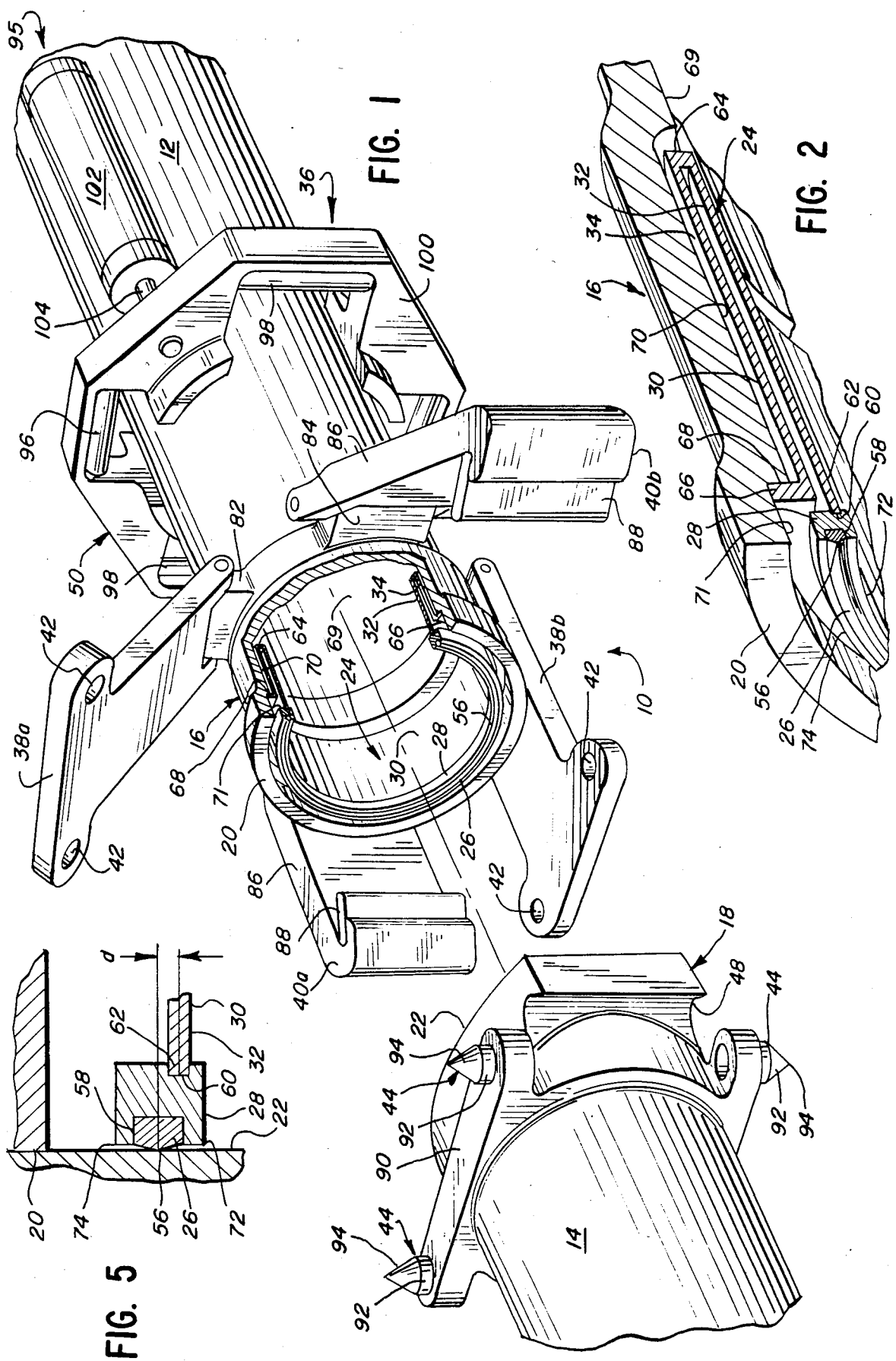

PIPE JOINT

BACKGROUND OF THE INVENTION

The present invention relates generally to pipe joints, and more particularly to a novel remote control pipe joint.

Piping systems are generally employed in fusion reactors for transportation of radioactive materials under a wide range of temperatures and pressures. It is desirable that pipe joints in such systems be capable of assembly and disassembly by remote control in order to avoid exposure of workers to radiation hazards. Leakage has been a problem in known remote control pipe joints, particularly where large pressure and temperature differences are to be maintained between the interior and the exterior of the joint. Conventional pipe joints which have been satisfactory from the standpoint of leakage are difficult to assemble by remote control. Thus, there is a need for an improved remote control pipe joint.

One common type of pipe joint seal is formed by positioning an O-ring between flanges on adjacent ends of the pipes to be joined, and bolting the flanges together. The pressure exerted on the O-ring by the flanges conforms the O-ring to asperities in the flange surfaces and thereby forms the seal. Elastomeric O-rings are used in some applications, but are subject to destruction by exposure to nuclear radiation or high temperature. Metal O-rings are generally preferred for pipe joints in the presence of high temperatures and/or radioactivity. The quality of the seal is somewhat dependent upon the ability of the metal to conform to the asperities of the flange surfaces and to behave elastically within a certain range to compensate for small displacements of the flanges relative to one another. Relatively soft metals such as copper are generally preferred.

One of the major shortcomings of seals made with metal O-rings is that the pressure required to form the seal typically causes excessive plastic deformation of the metal O-ring and results in strain hardening of the metal. The deformation is greatest near bolts because the closing force is greatest at these areas. The plastic deformation has two undesirable effects. First, if the seal is opened and subsequently reclosed, the O-ring frequently will not form a satisfactory seal upon reclosure because the hardness of the metal prevents it from conforming to surface asperities. Secondly, the O-ring no longer responds elastically to small displacements of the pipes relative to one another, and thus slight disturbances of the piping system may open small gaps between the O-ring and the flange surfaces against which it acts so as to permit leakage.

A problem which is particularly related to copper O-rings derives from the fact that copper has a relatively high coefficient of thermal expansion. When large fluctuations in temperature occur, the resulting thermal strain may cause friction between the sealing ring and the adjacent flange surfaces which may be deleterious to the seal and result in leakage.

SUMMARY OF THE INVENTION

In accordance with the present invention, a novel pipe joint is provided for joining adjacent ends of first and second pipe sections. The pipe joint includes a seal assembly which employs a spring having longitudinally strained coaxial sleeve portions to urge a sealing ring disposed within an end fitting on one pipe against a sealing face on an end fitting on the other pipe. To control thermal strain, the sealing ring is partially contained in a backup ring having a lower coefficient of thermal expansion than the sealing ring. To close the joint, a remote control closure system aligns the end fittings and presses the sealing face against the sealing ring, displacing the sealing ring longitudinally and deflecting the spring. The spring reacts to this deflection by urging the sealing ring against the sealing face with sufficient force to form a seal. The preferred sleeve portions are configured so that the closing force generated by the closure mechanism applies longitudinal compression and tension to the inner and outer sleeves respectively. The sleeve dimensions are selected so that the compression and tension do not exceed the elastic strain limits of the sleeve material.

BRIEF DESCRIPTION OF THE DRAWINGS

FIG. 1 is an exploded perspective view of a pipe joint embodying the present invention with portions broken away for purposes of clarity;

FIG. 2 is a fragmentary perspective view of a portion of the pipe joint of FIG. 1, shown on an enlarged scale and partially in section for purposes of clarity;

FIG. 5 is an enlarged fragmentary detail view of a portion of the seal assembly of FIG. 4.

DESCRIPTION OF THE PREFERRED EMBODIMENT

Figure 3:
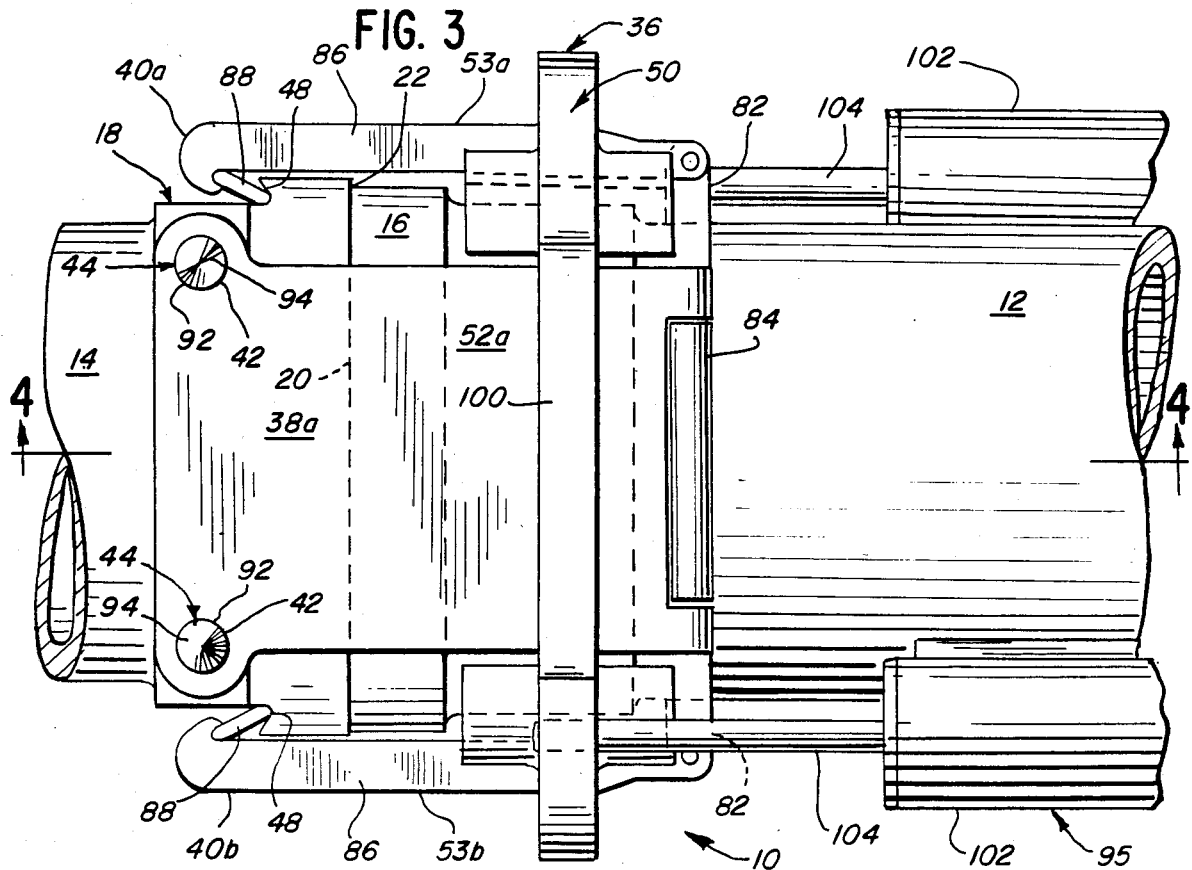
FIG. 3 is a plan view of the pipe joint of FIG. 1, shown on an enlarged scale and in closed position.
Figure 4:
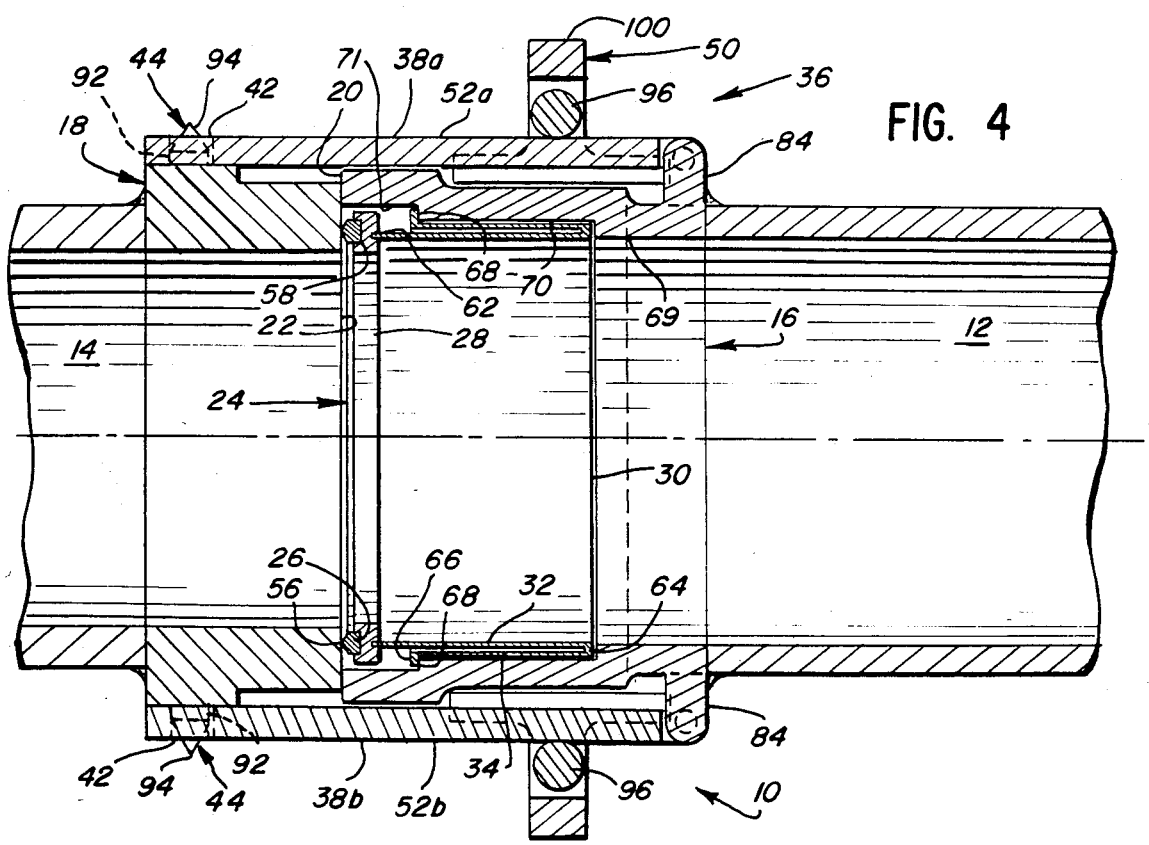
FIG. 4 is a longitudinal sectional view taken substantially along line 4—4 of FIG. 3, looking in the direction of the arrows.

The present invention is generally embodied in a pipe joint, indicated generally at 10, between a first pipe 12 and a second pipe 14. The pipes are joined by first and second end fittings 16 and 18 which are secured as by welding or the like to the adjacent ends of the first and second pipes, respectively, so as to be axially aligned therewith. The end fittings have planar transverse end faces 20 and 22 adapted for abutting relation when the end fittings are in coupled relation. A seal assembly 24 is operatively associated with the end fitting 16 and adapted for sealing engagement with end fitting 18 so as to prevent leakage at the joint. The seal assembly 24 includes a sealing ring 26 partially contained within a backup ring 28 which is disposed within the first end fitting 16 and urged toward the end face 22 on the second end fitting 18, hereinafter termed the sealing face, by biasing means in the form of a spring 30 so as to urge the sealing ring 26 into sealing relation with the sealing face 22. The spring 30 includes coaxial inner and outer sleeve portions 32 and 34, respectively, joined at their rearward ends.

Alignment of the pipes and closure of the joint is accomplished by a closure mechanism, indicated generally at 36, which includes locating arms 38a,b and toggle arms 40a,b pivotally attached to the exterior of the first end fitting 16. The locating arms 38a,b have small apertures 42 formed near their free ends to receive outwardly projecting guide pins 44 formed on or otherwise secured to the second end fitting 18. The toggle arms 40a,b are adapted to releasably engage outwardly projecting shoulders 48 on diametrically opposite sides of the second end fitting 18 so as to pull the end fittings together. A movable roller assembly 50 is selectively operable to apply pressure to outer surfaces 52a,b and 53a,b on the locating arms and toggle arms, respectively, so as to pivot them into engagement with their associated guide pins 44 and shoulders 48.

Turning now to a more detailed description of the invention, the forward sealing surface of the sealing ring 26 is defined by beveled surfaces which intersect to form an annular sealing edge 56 providing line contact with the sealing face 22. The ring 26 is preferably made of a soft metal, such as copper, which will conform to surface asperities in the sealing face 22 without damaging the sealing face when the ring is pressed thereagainst.

The backup ring 28 has an annular forward groove 58 to receive the sealing ring 26 and an annular rearward recess 60 which receives the forward end 62 of the inner spring sleeve 32. The sealing ring 26 is thus partially enclosed by the backup ring 28, with only the forward surface exposed. The backup ring is preferably made of a metal having a coefficient of thermal expansion lower than that of the sealing ring so that radial expansion and contraction of the sealing ring 26 due to temperature fluctuation may be reduced by the backup ring.

The sealing ring 26, backup ring 28, and spring 30 are received in a stepped bore defined by three coaxial cylindrical bore surfaces 69, 70, and 71 in the first end fitting 16. The outer spring sleeve 34 has an outwardly extending flange 66 at its forward end which is fixed as by welding to an annular shoulder 68 formed between coaxial cylindrical bore surfaces 69 and 70. To minimize disturbances in fluid flow at the rearward end of the spring 30, the inner spring sleeve is dimensioned so that its inner diameter is approximately equal to the inner diameter of cylindrical bore surface 71.

The inner and outer sleeve portions 32 and 34 of the spring 30 are integrally joined at their rearward ends by an annular transverse web 64. The flange 66 and transverse web portion 64 are made somewhat thicker than the sleeve portions 32 and 34 to minimize bending of these portions. This ensures that longitudinal strain of the sleeves will account for substantially all of the deformation of the spring.

The spring 30 is configured such that when the joint is open and the spring 30 is in its undeflected position, the annular sealing edge 56 of the sealing ring 26 extends approximately 0.030 inch forwardly from the plane of the end face 20 of the first end fitting 16. Thus, when the joint is closed and the sealing face 22 abuts the end face 20 of the first end fitting 16, the spring 30 is deflected approximately 0.030 inch. The sleeves 32 and 34 are selected so that the reaction force of the spring will increase to approximately 3,000 lb. per circumferential inch of seal as deflection occurs. Thus, with a sealing ring having a circumference of 9 in., the spring reaction force will increase to approximately 27,000 lb. during deflection of the spring 30 by 0.030 in.

Due to the relatively high coefficient of thermal expansion of the copper sealing ring 26, temperature changes may cause the backup ring 28 to experience radial strain somewhat greater than that experienced by the inner sleeve 32 to which it is attached. As a result, radial force is applied to the backup ring 28 by the inner sleeve 32. This force may be directed either radially inward or outward, depending upon whether the environment is at a high temperature or a low temperature. The radial force generates moments acting on the backup ring which tend to rotate it so that the inner annular corner 72 or the outer annular corner 74 may press against the sealing face 22 (FIG. 5). In order to control the magnitude of such moments. the inner sleeve 32 is radially offset by a distance "d" from the sealing edge 56 of the sealing ring 26 so that the spring reaction force applies an opposing moment to the backup ring. Depending upon the anticipated temperature range to which the interior of the pipe joint 10 is to be exposed, the radius of the inner sleeve 32 may be made slightly greater or slightly less than that of the annular sealing edge 56 of the sealing ring. If the pipe joint 10 is to be exposed to high temperatures, the radius of the inner sleeve 32 will be slightly greater than that of the backup ring. If the pipe joint 10 is to be exposed to low temperatures, the radius of the inner sleeve 32 will be slightly less than that of the sealing ring 26, as shown in FIG. 5.

As aforementioned, the closure mechanism 36 includes locating arms 38a,b and toggle arms 40a,b. The arms are arranged in diametrically opposed pairs and are pivotally mounted on corresponding pairs of outwardly extending lugs 82 and 84 which are formed integral with or otherwise secured externally to the first end fitting 16. One pair of lugs 82 provides parallel pivot axes for the locating arms 38a,b and the second pair of lugs 84 provides parallel pivot axes for the toggle arms 40a,b. The apertures 42 which are formed in the free end of each of the locating arms 38a,b are approximately circular, but are elongated by approximately 0.060 in. to allow a small degree of longitudinal freedom of movement for the pins 44. The guide pins 44 extend outwardly in laterally spaced pairs from mounting pads 90 formed on the second end fitting 18. The guide pins 44 have cylindrical base portions 92 and conical ends 94 to facilitate entry into the apertures 42 in the locating arms. Each of the toggle arms 40a,b includes a generally rectangular bar 86 with a short toggle member 88 pivotally attached to its free end. As explained in greater detail below, during closure of the joint the toggle members 88 engage the shoulders 48 and draw the end surfaces 20 and 22 into abutting relation.

The roller assembly 50 is moved by a drive assembly 95 to pivot the arms 38a,b and 40a,b into operating positions. The roller assembly includes a pair of rollers 96 for engaging the locating arms 38a,b and a pair of rollers 98 for engaging the toggle arms 40a,b. The rollers 96 and 98 are rotatably supported with their axes lying in a common plane transverse to the axis of the end fitting 16 by a frame 100 which extends peripherally of end fitting 16 and is movable longitudinally therealong.

The drive assembly 95 includes a pair of fluid pressure operated double acting cylinders 102 which are fixed to pipe 12 in parallel diametrically opposed relation. The cylinders 102 have piston rods 104 which are connected to the frame 100 so that actuation of the cylinders moves the frame 100 and the rollers 96 and 98 longitudinally of the end fitting 16 to apply balanced drive forces to the roller assembly 50. The cylinders 102 are preferably pneumatic cylinders connected to a suitable source of air pressure (not shown). Pneumatic cylinders are generally better able to tolerate exposure to radiation than hydraulic or electric drives which use polymeric components susceptible to breakdown when exposed to radiation.

To join the pipe sections 12 and 14, the corresponding first and second end fittings 16 and 18 are first brought into close end-to-end axially aligned relation. The roller assembly 50 is then driven forward to pivot the locating arms 38a,b into engagement with the guide pins 44 and pivot the toggle arms 40a,b into engagement with the shoulders 48. The outer surfaces 52a,b and 53a,b of the arms 38a,b and 40a,b are contoured so that alignment of the locating arms 38a,b is completed before the toggle arms 40a,b apply the closing force to pull the pipes together. The closure mechanism 36 is designed to be capable of applying about 2,000 lb. of corrective force through the locating arms 38a,b to align the end fittings 16 and 18. The elongation of the apertures 42 in the locating arms 38a,b and 40a,b permits the pins 44 to move longitudinally toward the first end fitting 16 as the toggle arms 40a,b pull the end fittings 16 and 18 together. When the opposing end surfaces 20 and 22 of the first and second end fittings engage, the joint is closed. The toggle members 88 do not "snap" into place, but remain under compression in the position shown in FIG. 3 after the joint is closed.

As the joint is closed, the annular sealing edge 56 of the copper sealing ring 26 is blunted and the spring 24 is deflected. The copper ring 26 undergoes plastic deformation through a small area near the sealing edge 56 due to stress concentrations there. Unlike deformation of O-rings in bolted flange joints, the deformation of sealing edge 56 is approximately uniform along the circumference of the sealing ring 26. Because the plastic deformation extends only through a small area of the ring 26 and is approximately uniform, the joint 10 may be opened and closed several times without serious detriment to the ability of the ring to conform to asperities in the sealing face 22 and form a satisfactory seal.

The elasticity of the spring 30 maintains sealing pressure during minor disturbances of the piping system so that small displacements of the pipe faces 20 and 22 relative to one another do not permit leakage. It is estimated that in a typical copper O-ring seal in a bolted flange joint where the ring has been compressed by 0.030 in. at a load increasing to 3,000 lbs., leakage may be caused by separating the flanges by as little as 0.00025 in. This is because copper O-rings are unable to respond elastically through more than a very small range after they have been crushed between the pipe flanges. The spring 30 in accordance with the present invention is believed capable of maintaining its sealing pressure through disturbances which separate the end faces 20 and 22 by as much as about 0.010 in.

In the preferred embodiment, the end fittings 16 and 18, spring 24 and backup ring 28 are made of stainless steel. The use of the same material in these components avoids stress concentrations which might otherwise result from differences in thermal strain at component interfaces due to temperature fluctuations. Stainless steel has a relatively low coefficient of thermal expansion and relatively high strength which makes the stainless steel backup ring 28 effective in controlling thermal strain of the sealing ring 26. The corrosion resistance of stainless steel is also desirable in this type of structure.

From the foregoing it will be appreciated that a novel reclosable pipe joint and associated seal are provided which may be assembled by remote control and which is resistant to leakage due to mechanical disturbances and temperature fluctuations. The pipe joint and seal may be constructed in various sizes and find application in various industrial and scientific applications.

While a preferred embodiment of the present invention has been illustrated and described, it will be understood by those skilled in the art that changes and modifications may be made therein without departing from the invention in its broader aspects. Various features of the invention are defined in the following claims.

What is claimed is:

1. In a pipe joint including first and second pipe end fittings having mutually abutting end surfaces, the combination therewith comprising:
   clamping means providing closing force urging said first and second pipe end fittings toward one another,
   a sealing ring positioned within said first pipe end fitting adjacent the end surface of said second pipe end fitting, and
   biasing means fixed to said first pipe end fitting and cooperative with said sealing ring to provide sealing force to urge said sealing ring into sealing relation against said end surface of said second pipe end fitting,
   said biasing means comprising a pair of generally cylindrical sleeves disposed coaxially within said first pipe end fitting,
   said sleeves being longitudinally elastically strained by said closing force,
   said biasing means being configured so that longitudinal elastic strain of said generally cylindrical sleeves caused by said closing force provides substantially all of said sealing force,
   said second sleeve being coaxially disposed within said first sleeve, said second sleeve being connected to said sealing ring at one end and joined to said first sleeve at an opposite end, said second sleeve being loaded substantially in longitudinal compression, said first sleeve being loaded substantially in longitudinal tension.

2. Seal means in accordance with claim 1 wherein said first and second sleeves are made of stainless steel.

3. A pipe joint for joining a forward end of a first pipe to a rearward end of a second pipe, comprising, in combination:
   first and second end fittings mounted on said first and second pipes respectively, said end fittings having abutting end faces,
   clamping means providing closing force for maintaining said end fittings in predetermined sealed relation to one another,
   a sealing ring disposed coaxially within said first end fitting and abutting said end face of said second end fitting,
   a backup ring partially enclosing said sealing ring, and
   spring means operative to urge said sealing ring toward said end face of said second end fitting, said spring means including a first metallic sleeve disposed coaxially within said first end fitting and having a forward end and a rearward end, a second metallic sleeve disposed coaxially within said first sleeve and having a forward and a rearward end, a metallic flange portion joining said first sleeve at its forward end to said first end fitting, and a metallic transverse portion joining the rearward ends of said first and second sleeves so that said rearward ends are substantially fixed relative to one another, said second sleeve being attached at its forward end to said backup ring,
   said first and second sleeves being subjected to elastic longitudinal strain by said closing force so as to provide biasing force to urge said sealing ring toward said end face of said second end fitting.

4. A pipe joint in accordance with claim 3 wherein said spring means is an integral structure.

5. A pipe joint in accordance with claim 4 wherein said spring means, said end fittings, and said back-up ring are made of stainless steel.

6. A pipe joint in accordance with claim 5 wherein said first end fitting has a circumferential shoulder extending radially inward to engage said flange portion of said spring means.

7. A pipe joint in accordance with claim 6 wherein said flange portion of said spring means is fixedly secured to said first end fitting.

8. A pipe joint in accordance with claim 3 wherein said clamping means comprises:
   a plurality of toggle arms pivotally mounted upon one of said end fittings,
   a plurality of shoulders formed on the other of said end fittings for engagement by said toggle arms,
   and closure means for pivoting said toggle arms into engagement with said shoulders to clamp together said end fittings.

9. A pipe joint in accordance with claim 8 wherein each of said toggle arms comprises an elongated bar pivotally mounted on one of the end fittings and a pivotal toggle member connected to the elongated bar.

10. A pipe joint in accordance with claim 9 wherein said clamping means further comprises:
    a plurality of locating arms pivotally mounted upon one of said end fittings, and
    a plurality of locating pins fixedly mounted upon the other of said end fittings to cooperate with said locating arms,
    said locating arms having apertures for receiving said locating pins.

11. A pipe joint in accordance with claim 10 wherein said closure means comprises frame means, a plurality of rollers rotatably supported by said frame means and adapted to engage said toggle arms and locating arms, and drive means for moving said frame means to bring said rollers into engagement with said toggle arms and said locating arms to pivot said arms.

12. A pipe joint in accordance with claim 11 wherein said drive means comprises a plurality of fluid pressure cylinders.

13. A pipe joint in accordance with claim 12 wherein said fluid pressure cylinders are driven by compressed air.

* * * * *